United States Patent [19]
Abramson

[11] Patent Number: 5,537,397
[45] Date of Patent: Jul. 16, 1996

[54] SPREAD ALOHA CDMA DATA COMMUNICATIONS

[75] Inventor: Norman Abramson, Honolulu, Hi.

[73] Assignee: Aloha Networks, Inc., San Francisco, Calif.

[21] Appl. No.: 255,720

[22] Filed: Jun. 7, 1994

[51] Int. Cl.$^6$ .................................................. H04J 13/00
[52] U.S. Cl. .............................. 370/18; 370/93; 375/200; 375/206
[58] Field of Search ........................ 370/18, 93; 375/200, 375/205, 206, 208, 209, 210, 343

[56] References Cited

U.S. PATENT DOCUMENTS

| | | | |
|---|---|---|---|
| Re. 32,905 | 4/1989 | Baran | 370/104 |
| 4,455,651 | 6/1984 | Baran | 370/104 |
| 4,545,061 | 10/1985 | Hileman | 375/343 |
| 4,841,527 | 6/1989 | Raychaudhuri et al. | 371/32 |
| 5,084,900 | 1/1992 | Taylor | 375/1 |
| 5,136,612 | 8/1992 | Bi | 375/1 |
| 5,151,919 | 9/1992 | Dent | 375/1 |
| 5,218,619 | 6/1993 | Dent | 375/1 |
| 5,235,612 | 8/1993 | Stillwell et al. | 375/1 |
| 5,245,612 | 9/1993 | Kachi et al. | 370/104.1 |
| 5,305,348 | 4/1994 | Izumi | 375/1 |
| 5,377,225 | 12/1994 | Davis | 375/206 |
| 5,410,568 | 4/1995 | Schilling | 375/206 |
| 5,430,760 | 7/1995 | Dent | 375/200 |
| 5,430,761 | 7/1995 | Bruckert et al. | 375/200 |

OTHER PUBLICATIONS

Meile, Denise, "Most Often Asked Question About CDMA", Qualcomm Announcement of Aug. 23, 1991.
Price et al., "A Communication Technique for Multipath Channels", Proceedings of the IRE, vol. 46, pp. 555–570, Mar. 1958.
Like et al., "MARSAT–A Maritime Satellite Communication System", COMSTAT Technical Review, vol. 7, No. 2, Fall 1977.
Marcus, Michael J., "Regulatory Policy Considerations for Radio Local Area Networks", IEEE Communications Magazine, vol. 25, No. 7, Jul. 1987.
Abramson, Norman, "Spread Aloha for VSAT's", ALOHA System Technical Report B86-4, University of Hawaii, Honolulu, Jun. 1986.
"CDMA Wireless Communications", Commercial brochure dated Apr. 30, 1993.
Abramson, Norman, "Development of the ALOHANET", IEEE Transactions on Information Theory, vol. IT–31, No. 2, Mar. 1985.
Scholtz, R. A., "Multiple Access with Time–Hopping Impulse Modulation", Communication Sc. Inst., Univ. of S. CA., Los Angeles, CA.
Steele, Raymond, "Speech Codecs for Personal Communications", IEEE Communications Magazine, Nov. 1993.
Ewerbring et al., "CDMA–IC: A Proposal for Future High Capacity . . . ", Proceedings of the 1993 IEEE Vehicular Technology Conf., pp. 440–443.
Kerr, Richard, "CDMA Digital Cellular", AN ASIC Overview, Applied Microwave & Wireless, pp. 30–41, Fall 1993.

(List continued on next page.)

*Primary Examiner*—Douglas W. Olms
*Assistant Examiner*—Shick Hom
*Attorney, Agent, or Firm*—James Creighton Wray

[57] ABSTRACT

Multiple transmitters transmit data signals using identical spreading codes. A single matched filter of a receiver receives all the signals. A broadcast timing control signal retards or advances timings of individual transmitters to offset the interleaved signals. A subtracting circuit subtracts first and strongest signals until a single signal remains, and then reinserts the subtracted signals in the receiver. The identical code spreading sequence used in all the transmitters and in the matched filter is selected from a specific class of codes known as maximum length shift register sequences in a length equal to $2^n-1$ for integer values of n. The method provides multiple access to a data communications channel without prearranging times or querying availability, and with automatic offsetting of the identical form signals.

16 Claims, 5 Drawing Sheets

OTHER PUBLICATIONS

Abramson, Norman, "Fundamentals of Packet Multiple Access . . . ", IEEE Journal on Selected Areas in Communication, vol. 10, No. 2, Feb. 1992.

Abramson, Norman, "VSAT Data Networks", Proceedings of the IEEE, Special Issue on Satellite Comm., vol. 78, No. 7, pp. 1267–1274, Jul. 1990.

Viterbi et al., "Erland Capacity of a Power Controlled CDMA System", Qualcomm Incorporated, Feb. 11, 1993.

"Multiple Access Communications: Foundation for Emerging Technologies", Norman Abramson, Editor, IEEE Press, 1993.

SPREAD ALOHA CDMA DATA COMMUNICATIONS

1. BACKGROUND OF THE INVENTION

This invention is related to the multiple access sharing of a single communication channel by many transmitters of digital information.

Code Division Multiple Access (CDMA) is a general technique used in telecommunication systems to allow multiple access (the sharing of a single communication channel by many transmitters) in a variety of telecommunications media. The media can be satellite channels, microwave and general radio channels or even fiber, cable and wire channels. CDMA channels generally are configured so that many transmitters radiate signals to a single hub station. This invention is generally concerned with the simplification of the process of transmission of digital signals from many remote terminals to a single hub station as shown in FIG. 1.

The "code division" in CDMA refers to the fact that in the prior art all of these CDMA channels rely on the use of a different binary code by each transmitter in the network in order to separate signals from different transmitters at the hub receiver. See for example Norman Abramson, *Multiple Access Communications: Foundations for Emerging Technologies*, (editor) IEEE Press, 1993. In the prior art the general understanding that multiple codes and code division are required for the effective operation of a CDMA channel is explicitly contained in many CDMA patents. See for example U.S. Pat. No. 4,455,651 (Baran), U.S. Pat. No. 4,841,527 (Raychaudhuri et al.), U.S. Pat. No. 5,136,612 (Bi), U.S. Pat. No. 5,151,919 (Dent), U.S. Pat. No. 5,218,619 (Dent), U.S. Pat. No. 5,235,612 (Stillwell et al.), and U.S. Pat. No. 5,305,348 (Izumi).

We have discovered that different codes in a CDMA system are not necessary in order to distinguish among different receivers in a given network. The separation of signals from different receivers has much more to do with the high bandwidth required in a CDMA network, rather than any properties of codes. If a CDMA system is built with the same code for all users in a channel using a high bandwidth, signals from different transmitters will still be separated at the receiver. This is the version of CDMA which is the basis of the claims in this patent. Our claims relate to certain key simplifications in the prior art made possible by elimination of multiple codes in CDMA data networks. For historical reasons we refer to our simplified version of CDMA which uses the same code for all transmitters as Spread ALOHA/CDMA(SA/CDMA).

The general misconception in the prior art dealing with the purpose of different codes in CDMA can be traced to the military origins of CDMA, where the purpose of the different codes used in military CDMA systems has much more to do with maintaining secrecy in communications than with multiple access. See for example Marvin K. Simon, Jim K. Omura, Robert A. Scholtz and Barry K. Levitt, *Spread Spectrum Communications, Volumes 1,2 and 3*, Computer Science Press, Rockville, Md., 1985.

The use of multiple codes in CDMA systems today results in major complications in the design of such systems. The complications flow from the fact that since each user in these systems has a separate code and since the code is used to separate one user from another, the hub station in a CDMA network must contain a different receiver for each user code in the network. Thus the hub stations are unreasonably complicated, and CDMA systems have in general been the subject of much criticism because of this complication. Furthermore many functions of a CDMA system are made more complex, and many subsidiary functions which could otherwise be used in the system are precluded because of the fact that the hub receiver does not know the code which is used in each signal being received. If all transmitters use the same signal many more options for the design of the system become available.

The transmission of a signal from a single user in a multiple access CDMA channel can be described in terms of a complex signal representation as shown in FIG. 2. The general signal modulation process is represented as the multiplication of the data input signal a (t) by a modulated carrier, b (t). The resulting transmitted signal is $$c(t)=a(t)b(t) \quad (1)$$

If we require that b (t) the modulated carrier for this user satisfies $$|b(t)|^2=1 \quad (2)$$

then the fundamental operation of a receiver is to multiply the received signal plus noise, c(t)+n(t), by the complex conjugate of the modulated carrier, b*(t), in order to recover the original information in a (t).

$$[c(t)+n(t)]b^*(t)=a(t)+n(t)b^*(t) \quad (3)$$

This representation is general enough to include conventional forms of modulation, when b (t) is a narrowband carrier. But in the case of CDMA, the modulating carrier, b(t), is a different wideband carrier for each possible terminal in the network. This multiplicity of possible transmitter carriers is reflected in a multiplicity of receivers required at a CDMA base station in order to demodulate the received signal. Clearly if the total number of potential data terminals in the network is much larger than the number of terminals active at any given time this requirement can introduce considerable complexity into the design of a CDMA multiple access system.

2. COMMERCIAL CDMA SYSTEMS USING THE PRIOR ART

The two significant commercial CDMA data networks which have been built so far (one by Equatorial Communications, Inc. and one by Qualcomm, Inc.) have addressed this problem of different carriers used by different terminals in a CDMA system in two distinct ways.

In the Equatorial Communications CDMA satellite network composed of large numbers of C-200 micro earth terminals, each terminal was assigned a deterministic CDMA code spreading sequence to form a different wideband carrier, b (t). In order to demodulate a user at the hub station then, it was necessary to install a separate card, called an "ear card", matched to each different spreading sequence, for each user authorized to transmit in the system. With the set of users changing on a daily basis, it was therefore necessary to insert and remove cards at the base station in order to keep current with the existing customer set. The maintenance logistics of such a design for a large network are not easy.

The Qualcomm CDMA system provides an ambitious network design for use by voice traffic in a cellular based telephone system. This design has been adopted as the IS-95 standard by the US Telecommunication Industry Association. In the Qualcomm design the problem of multiple carriers at the terminals and multiple receivers at the base station is handled by software rather than hardware as in the Equatorial system.

The process begins by a remote terminal requesting access to the network. Since the terminals do not have a permanently assigned coding sequence, this request is sent via a separate ALOHA channel within the Qualcomm CDMA protocol.

After the ALOHA call request is received at the base station the terminal is assigned a spreading sequence and other setup parameters. These are transmitted to the requesting terminal by means of the broadcast channel from the base station. The spreading sequence is loaded into the terminal and a separate receiver matched to the assigned spreading sequence is assigned at the base station. In the present generation of the Qualcomm design a maximum of 64 such receivers can be assigned. The Qualcomm CDMA design eliminates the logistical problems associated with installing a separate "ear card" for each different spreading sequence as in the Equatorial Communications CDMA design. But in order to provide a different spreading sequence to each user in a dynamically changing user set, the Qualcomm system must provide a separate ALOHA request channel. In this respect the Qualcomm design is similar to a demand assigned multiple access (DAMA) system. As in any DAMA system the request channel introduces a delay and an overhead in the call setup process.

For a network serving only voice traffic it does not appear that this overhead and delay is a serious problem. But in a network which includes a significant amount of transaction traffic, or other digital traffic with less regularity than voice traffic, both the overhead and the delay could limit the network flexibility and the ability of the network to adapt to a more general traffic mix.

Because of the dynamic assignment of different spreading sequences, the Qualcomm base station does not require a separate receiver for each spreading sequence in the network, but it does require a separate receiver for each spreading sequence active in the network. In the present Qualcomm design the maximum number of such receivers in a single cell is fixed at 64. In principle this number could be increased, but the requirement that a separate receiver be used for each different CDMA spreading sequence is a fundamental limitation on both the simplicity and the flexibility of CDMA operation.

3. CODE DIVISION IN CDMA

That "code division" is the basic mechanism which allows a CDMA hub station to receive signals from different transmitters seems to be a common assumption in both the technical and the commercial literature of CDMA networks (see paragraph 3 of section 1, above). There is no doubt that different codes are used by different transmitters in a CDMA network, and there is no doubt that some number of transmitters can share a common channel with only a small probability of mutual interference. However it does not necessarily follow from these two observations that code division is in fact the mechanism which allows the separation of transmissions from multiple users in a CDMA network. On the contrary, we now show that if we choose the same spreading code for all users in a CDMA system the channel will still have a multiple access capability. In view of this observation it is not clear in what sense "Code Division" is in fact the multiple access mechanism operating in a Code Division Multiple Access channel.

Consider a CDMA channel transmitting chips at the rate of $R_c$ chips per second with a spreading factor of g, with g>>1. Then the bit rate for a single transmitter is $$R_b = \frac{R_c}{g} \text{ bits/second} \quad (4)$$

A portion of a typical response of a matched filter or correlator detector at the hub station receiver to the signal from a single transmitter with a spreading factor, g, equal to 127 is shown in FIG. 3. The bits of the received packet are offset from each other by 127 chips at the output of the detector. In this example we see the first three bits of the packet, (1 0 1 . . . ).

If we now add a second transmitter to the multiple access channel using the identical spreading sequence, and the hub receiver operates in a linear mode, a typical output of the receiver will appear as shown in FIG. 4.

In FIG. 4 the bits of the second packet (1 1 0 . . . ) are offset from the bits of the first by d chips. In order to simplify the analysis we assume only integer values of d are allowed. We can continue to add users to this multiple access channel limited only by the self interference terms of the single spreading code as long as no user overlaps with any other user. If there are k transmitters sharing the CDMA channel and all the offsets are chosen at random, the probability that a given bit will not overlap with some other bit is given by $$\left(1 - \frac{1}{g}\right)^k \quad (5)$$

We can define G, the CDMA traffic in the channel, by k=Gg. Then in the limit for large spreading factors, g, the probability that a given bit will not overlap with some other bit is given by $$\lim_{g \to \infty} \left(1 - \frac{1}{g}\right)^k = e^{-G} \quad (6)$$

The form of the result in (6) suggests a connection between this view of CDMA and an ALOHA channel.

The view of CDMA presented in this section is not a conventional one, so it may be helpful if we summarize here what we have shown and what we have not shown. In a CDMA system, multiple access capabilities exist whether different codes are used or the same code is used for transmitters in the shared channel. The acronym CDMA might just as accurately refer to Contention Division Multiple Access as to Code Division Multiple Access. A large value for the spreading factor, g, is necessary for the desired level of division in the channel; different codes are not.

4. SUMMARY OF THE INVENTION

Even though different codes are not required for multiple access in CDMA channels, the question remains as to whether anything can be achieved by using multiple coding sequences. The answer to this question is a qualified, yes. In the case of multiple codes as well as in the case of a single code for all transmitters, the multiple access capability of the channel is a probabilistic one. As long as there are only a few transmitters in the channel both methods will work well and the probability of two transmitters interfering with each other will be small. Under these conditions, if both the multiple codes system and the single code system are compared using the protocols designed for the multiple codes system, the multiple codes system of the prior art will have a smaller probability of interference while the single code system disclosed herein will have a simpler implementation.

However it is not necessary that a single code system play by the rules of a multiple codes system as implemented in the prior art when a network is designed. When all transmitters use the same spreading sequence a number of system simplifications and code design options are available which can make both the throughput and the efficiency of a single code system superior to that of the multiple codes system as used in the prior art even at low values of throughput. It is the implementation of those system simplifications and code design options which are disclosed herein.

Because all transmitters in the multiple access Spread ALOHA channel use the same spreading sequence, the problem of synchronizing the data bursts transmitted from the users is considerably simpler than in conventional CDMA. The difference is that in Spread ALOHA CDMA the initial synchronization is with a known waveform rather than an unknown waveform as is the case in conventional CDMA. In a Spread ALOHA CDMA hub station it is possible to measure the arrival time of user bursts at the hub station and to send high accuracy timing information to the users in the broadcast channel transmitted by the hub station and received by all users. This information can be used to control the user transmission times at the chip level, greatly simplifying the processing of user signals at the hub station. For Spread ALOHA channels where the user terminals are not mobile or are moving at a low velocity relative to the base station this information can be used to identify different signal paths from the same user terminal for use in a multipath receiver which can coherently combine received signals from different paths. For all Spread ALOHA channels this information can be used to implement collision free protocols at the hub station by adjusting user timing in order to interleave packets from different users at the chip level.

As disclosed herein multiple signals from multiple transmitters, all using the identical code spreading sequence, are controlled by a pilot signal transmitted from a hub station. The multiple signals are all detected at the output of a single matched filter or correlator (or a multiplicity of identical matched filters or correlators) in the hub station made possible by the use of the identical coding sequence. The output of the matched filter or correlator in the hub station is used to transmit a pilot control signal to all transmitters to advance or retard the timing of the multiple transmitters so that all transmissions from all transmitters are received at the hub station offset from each other by an integer number of chip times, thus simplifying the process of signal detection. This method can be used on packet radio channels, on microwave channels, on fiber optic channels, on cables and wires and on satellite channels.

As disclosed herein multiple signals from multiple transmitters, all using the identical code spreading sequence, are controlled by a pilot signal transmitted from a hub station. The multiple signals are all detected at the output of a single matched filter or correlator (or a multiplicity of identical matched filters or correlators) in the hub station made possible by the use of the identical coding sequence. The output of the matched filter or correlator in the hub station is used to transmit a pilot control signal to all transmitters to advance or retard the timing of the multiple transmitters so that all transmissions from all transmitters are received at the hub station offset from each other by an integer number of chip times, thus decreasing the mutual interference among the multiple transmitters. This method can be used on packet radio channels, on microwave channels, on fiber optic channels, on cables and wires and on satellite channels.

In principle the interference-to-noise ratio in a CDMA system can be made arbitrarily large by using a subtraction algorithm to subtract identified primary and multipath signals in the hub station. In practice however the use of different codes for each remote transmitter limits the interference-to-noise ratio to about 10 db in the IS-95 CDMA digital cellular standard and even less in other systems. With the use of the same spreading code by all remote terminals, the use of a subtraction algorithm to increase the throughput of a multiple access system becomes much more practical. This class of algorithms has the potential of allowing the interference-to-noise ratio to grow without limit while at the same time retaining a theoretical throughput of 100%.

A portion of a typical response of a matched filter or correlator detector at the hub station receiver to the signal from a single transmitter with a spreading factor, g, equal to 127 is shown in FIG. 3. The bits of the received packet are offset from each other by 127 chips at the output of the receiver. In this example we see the first three bits of the packet, (1 0 1 . . . ). The response of the receiver consists of a main peak and interference terms between the main peak. In this example there are 126 interference terms for each peak term. These interference terms will limit the ability of the hub station to receive several signals because the interference terms from several signals will add at the chip times at the output of the receiver and it will be more difficult to pick out the signal peaks of multiple transmitters. For only one transmitter into only one receiver there are two forms the sequence of interference terms can assume. The first form corresponds to the interference terms generated when two successive bits into the receiver are identical (either 00 or 11) and the second form corresponds to the interference terms generated when two successive bits into the receiver are different (either 01 or 10).

In the prior art of CDMA, since a different spreading code is used for each transmitter in the network, a different receiver (either in matched filter or in correlator form) must be available in the hub station for each transmitter. In this situation the response of the receiver from station A to a signal from station B is part of the interference when the response of the receiver from station A to a signal from station A is received. If there are n separate transmitters in the network then there are $n(n-1)/2$ different combinations of interfering signals which must be accounted for. When we multiply this value by the two different forms of interference terms discussed in the immediately preceding paragraph we see that in the prior art with multiple spreading codes there are $n(n-1)$ forms the sequence of interference terms can assume. In the case of Spread ALOHA CDMA where all transmitters use identical spreading codes there are only two different forms the sequence of interference terms can assume. This reduction in the number of different forms the sequence of interference terms can assume makes possible the implementation of a simplified form of subtraction algorithm in a Spread ALOHA CDMA network.

In a subtraction algorithm operating in a multiple access channel, the receiver first determines the strongest or earliest signal to arrive and then subtracts this signal and the interference terms it generates from either the matched filter or correlator input or the matched filter or correlator output. After the subtraction the receiver then processes the new signal with the first signal subtracted and tries to detect the next signal. This process is repeated each time a new signal is picked out of the multiple access channel in order to eliminate interference of packets from different transmitters.

As disclosed herein if there is a single spreading code for all transmitters in the multiple access network, the process of subtraction can be implemented by storing only two different interference sequences. These interfering sequences can be easily recalled from storage and used in a subtraction algorithm. In the prior art using a different spreading code for each transmitter, the number of possible interference sequences becomes impractically large for networks with many transmitters. For example with 1000 possible transmitters in the network, and 1000 different spreading sequences, the number of different forms for interference sequences is 999,000 and it is impractical to store this number of sequences in the receiver. Therefore in the prior art the implementation of a subtraction algorithm must involve various sub-optimal approximations for networks with large numbers of transmitters.

As disclosed herein successive signals from a multiple access channel can be subtracted from the received signal in order to allow easier detection of other signals contained in the received signal. The method is implemented in a multiple access CDMA channel where different transmitters employ the same spreading code in the channel for all transmitters. The subtraction is implemented either by reconstructing a single spreading sequence at the input to a matched filter or correlator, or by reconstructing a signal from one of two spreading sequences at the output of the matched filter or correlator. The method allows the detection of multiple signals in a single multiple access channel in the presence of mutual interference. This method can be used on packet radio channels, on microwave channels, on fiber optic channels, on cables and wires and on satellite channels.

As discussed above if there are n separate transmitters in a network then there are $n(n-1)/2$ different combinations of interfering signals which must be accounted for. When we multiply this value by the two different forms of interference terms we describe above we see that in the prior art with multiple spreading codes there are $n(n-1)$ forms the sequence of interference terms can assume. In the case of Spread ALOHA CDMA where all transmitters use identical spreading codes there are only two different forms the sequence of interference terms can assume. This reduction in the number of different forms the sequence of interference terms can assume makes possible the selection of a certain class of spreading codes which result in decreased values for the interference terms in a Spread ALOHA CDMA network.

As disclosed herein the class of spreading codes which result in this decreased value for the interference terms are called maximal length feedback shift register sequences, sometimes known as "m-sequences". Such sequences are available of length equal to $2^n-1$ for all integer values of n. One property of such sequences is that a cyclical shift and correlation of an m-sequence results in an output with a peak value equal to the length of the sequence ($2^n-1$) and with sidelobes equal uniformly to $-1$. Since the interference terms generated at the output of a matched filter or correlator detector when two successive bits into the receiver are identical (either 00 or 11) correspond to a cyclic shift and correlation of the spreading sequence this means that when two successive bits into the receiver are identical (either 00 or 11) the interference terms generated will all be equal to $-1$.

In FIG. 5 we have illustrated the result of correlating a m-sequence chip sequence of length 127 with the spread bit sequence 111 (successive bits are identical), while in FIG. 6 we show the result of correlating the same m-sequence chip sequence with the spread bit sequence 101 (successive bits are not identical). Note that the interference terms equal to $-1$ (between chips 128 to 380) in FIG. 5 are negligible when compared to those of FIG. 6.

As disclosed herein since the probability that two successive bits will be identical (either 00 or 11) in a random sequence of bits is 0.50 this means that 50% of the interference terms will be equal to $-1$ if an m-sequence is used as the spreading code in a Spread ALOHA CDMA network. Therefore the choice of these sequences as the spreading code will result in approximately 50% less interference than the random codes used in state of the art CDMA systems. Alternatively we can say that a Spread ALOHA CDMA network using m-sequences as the spreading code will have about twice the capacity of a state of the art CDMA network using random or pseudorandom codes.

Among the new uses made practical by the simpler form of multiple access technology disclosed herein is a very low cost passive location system that could be embedded in millions of cars and then used with existing networks to retrieve stolen cars, locate automobiles that are disabled or find accident sites. The same type of device could be used for fleet control by trucking companies, or for inventory control of expensive or sensitive items by the military.

Another use for this technology is in television talkback where a wireless remote control unit could be utilized to allow viewers to purchase items from a shopping channel, register their opinions for polls, answer survey questions, gamble, or play complex video games. Remote meter reading for utilities is another new use for this technology and could be employed to both lower the cost of gathering data for billing purposes and to increase revenues by reallocating under-utilized resources on a supply grid.

These and further and other objects and features of the invention are apparent in the disclosure, which includes the above and ongoing written specification, with the claims and the drawings.

DETAILED DESCRIPTION OF THE DRAWINGS

Figure 1:
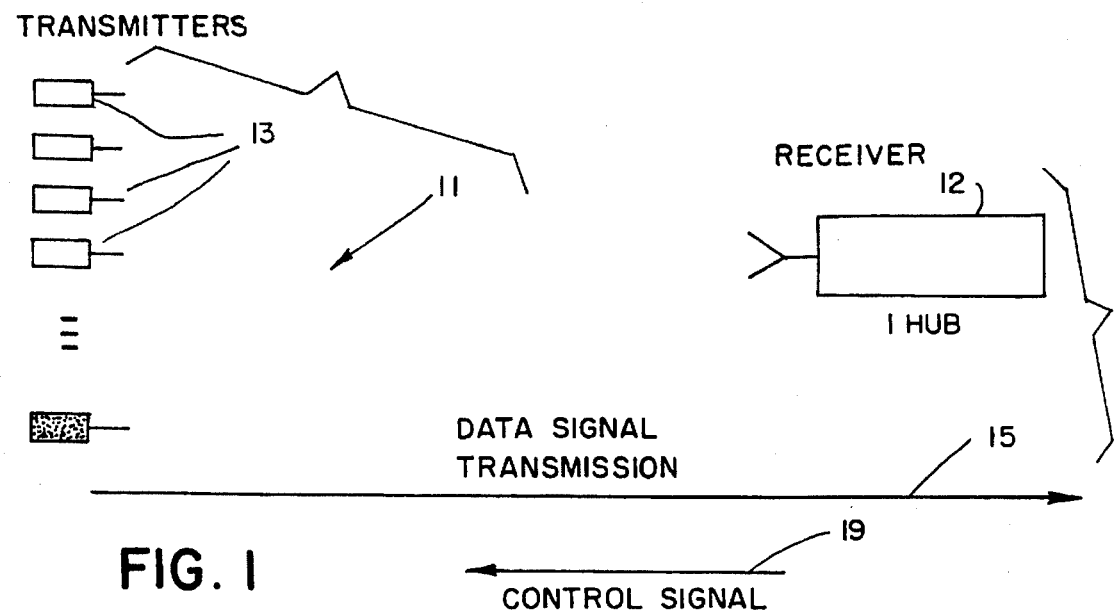
FIG. 1 shows a multiple access channel.

Referring to FIG. 1, the system of the present invention is generally indicated by the numeral 11. One or more of the transmitters 13 transmit data signals 15 to a receiver at hub 12. In one form of the invention, the hub broadcasts control signals 19 to all of the transmitters.

Parts of the data signals 15 transmitted to the hub 12 include identifications of individual transmitters. The broadcast signals 19 include the identification of particular transmitters when instructing those particular transmitters 13 either to advance or retard their timing, so that the data signals from one transmitter are offset from the data signals from other transmitters when they are received by hub 12.

Figure 2:
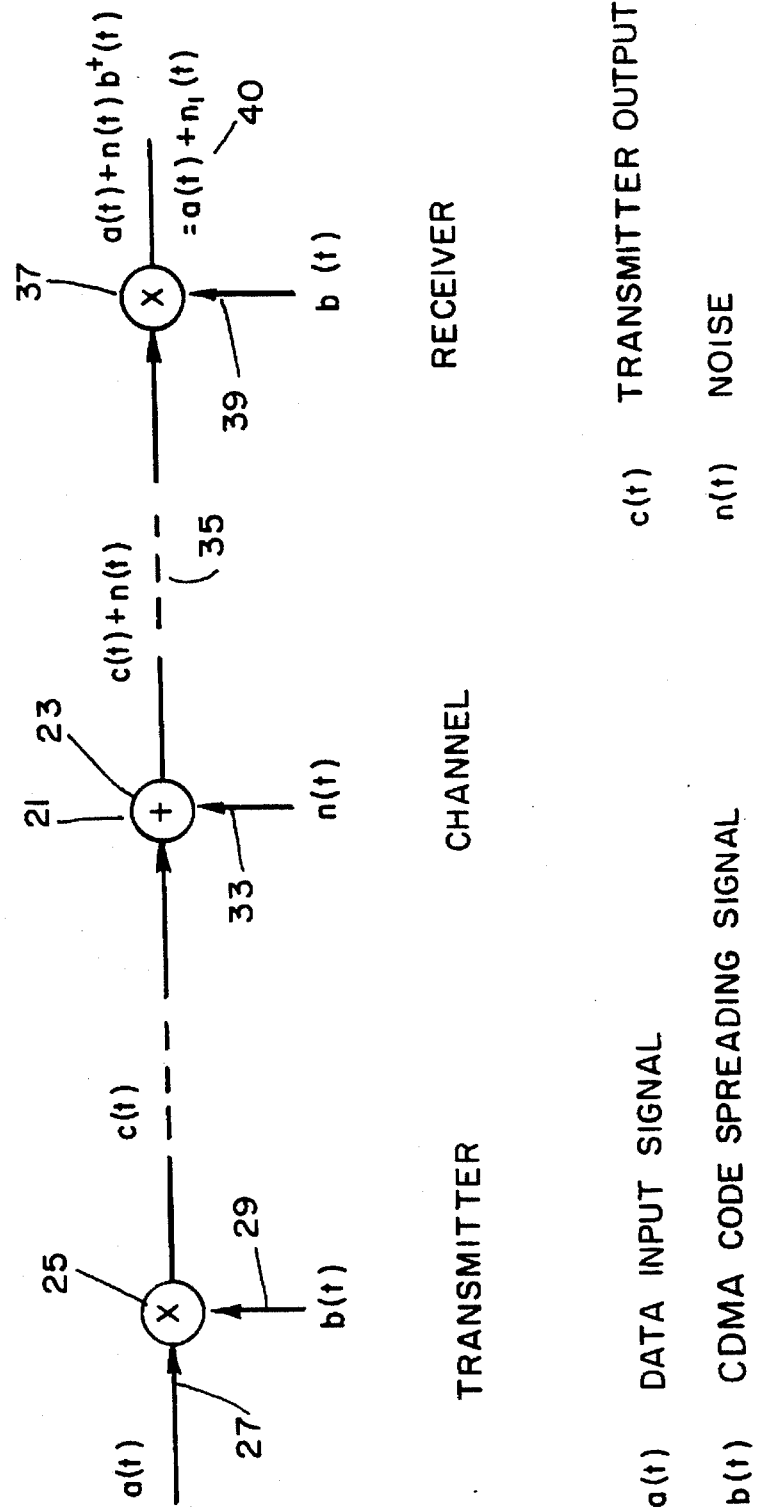
FIG. 2 shows a single user modulation and demodulation in a CDMA channel.

FIG. 2 shows a single user transmission 21 in a CDMA channel 23. The transmitter 25 receives a data input signal 27, and includes that data for transmission in a CDMA code spreading signal 29. The result is a transmitter output signal 31. Noise 33 is introduced by the channel to the signal 35 which is received at the receiver 37. The CDMA code spreading signal 39, which is the same (or is a phase shifted-version of signal 29), is input at the receiver to result in the data input signal, plus the noise 40.

Figure 3:
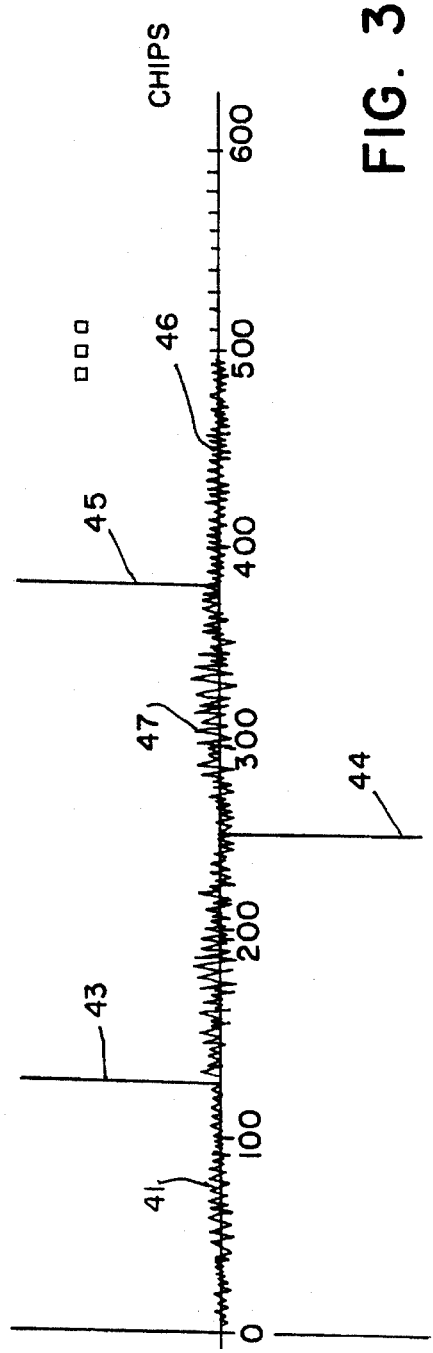
FIG. 3 shows a receiver output with one packet in a CDMA channel.

FIG. 3 shows the receiver output 41 with output data bits 43, 44 and 45 with one packet in a CDMA channel 46. The noise 47 is not a major factor, since the signal 43 to noise 47 ratio is large. The numbers represent number of chips. The bits, 43, 44 and 45 of the received packet are offset from each other by 128 chips at the output of the detector, as shown in FIG. 3.

Figure 4:
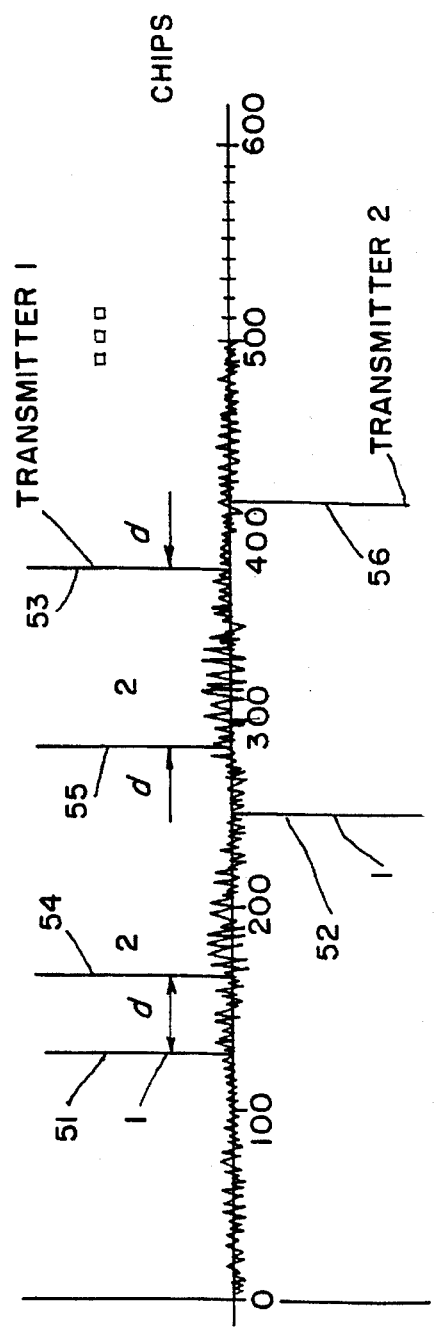
FIG. 4 shows a receiver output with two packets in a CDMA channel.

When a second packet is added, as shown in FIG. 4, the bits in individual packets are offset from each other by 128 chips so that bits 51, 52 and 53 from transmitter 1 are offset from each other by 128 chips. Bits 54, 55 and 56 from transmitter 2 are offset from each other by 128 chips. Bits 51 and 54, bits 52 and 55 and bits 53 and 56 are offset from each other by a number of chips d.

As long as the bits from transmitter 1 and transmitter 2 are sufficiently offset, such as shown in FIG. 4, it is possible for the receiver to distinguish between bits from the different transmitters. Since the transmitters are autonomous, they may begin transmitting at any time on the repeatable pattern. When the bits become too crowded, it becomes more difficult to distinguish between the bits of transmitter 1, transmitter 2 and transmitter n.

Figure 5:
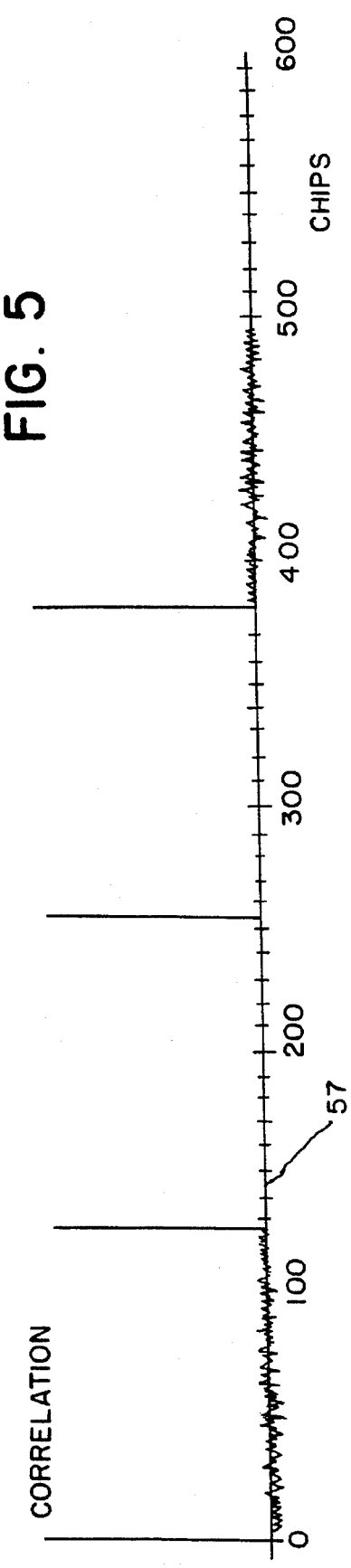
FIGS. 5 and 6 show correlations of chip sequences and data bits with no bit transition, and with a single bit transition, respectively.
Figure 6:
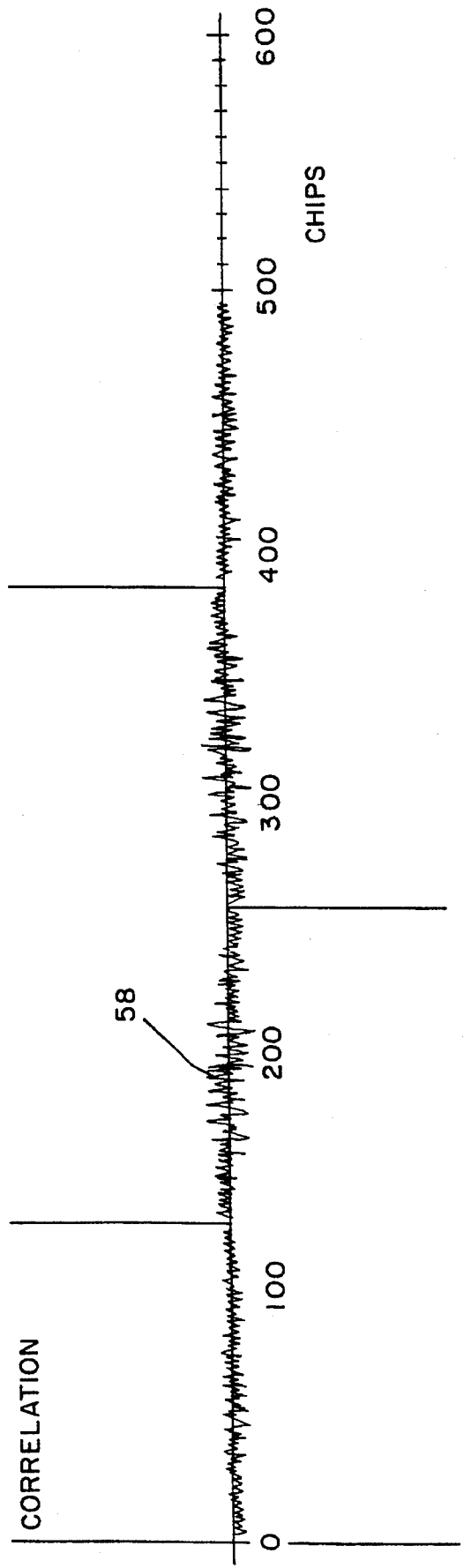

The present invention as shown in FIGS. 5 and 6 generates just two interference patterns. One pattern 57 (in FIG. 5) is generated when successive bits in a given packet are identical, and another pattern 58 (in FIG. 6) is generated when successive bits in a given packet are different. The level of the interference pattern generated when successive bits in a given packet are identical as shown in FIG. 5 is constant at the level of −1.

Figure 7:
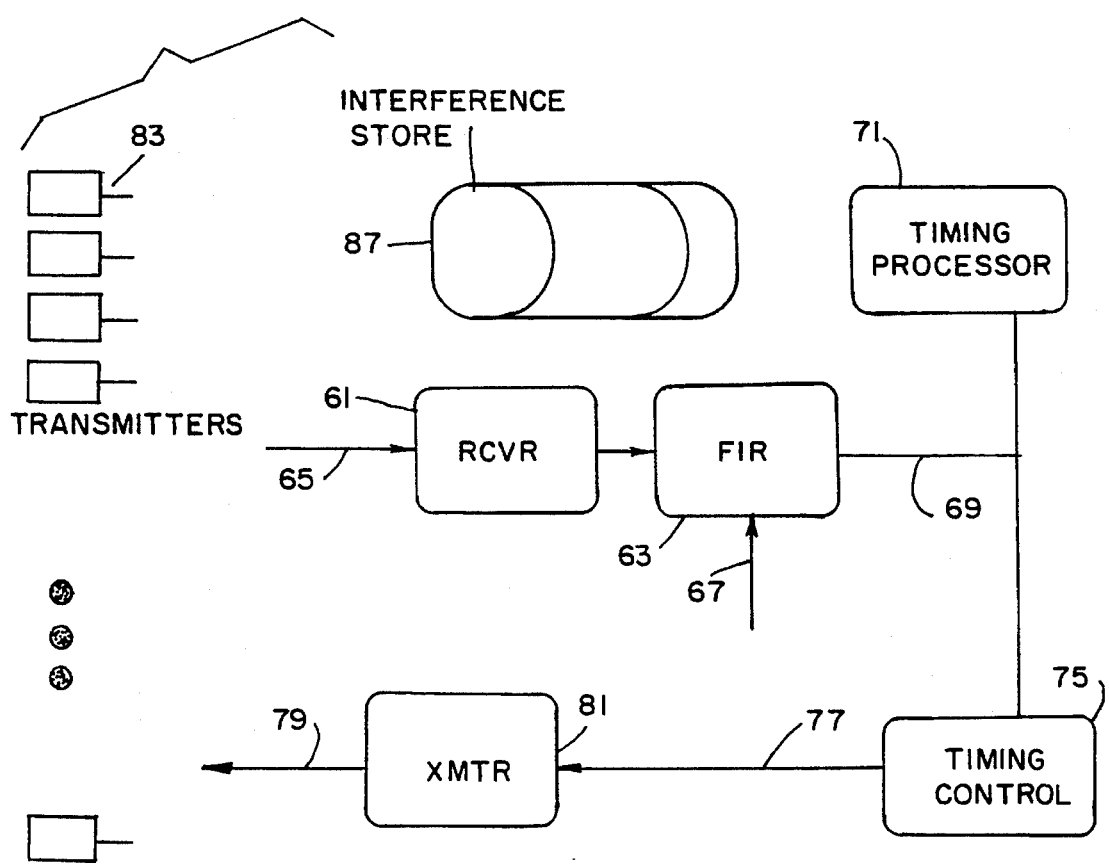
FIG. 7 is a schematic representation of Timing Control with a single spreading sequence for all transmitters.

FIG. 7 schematically shows a receiver 61, which processes the received signal to obtain chip samples which are processed by a matched filter or correlator 63. The receiver 61 receives the multiple input signals 65 from a single packet radio channel, microwave channel, fiber optic channel, satellite channel, cable or wire. Each of the signals in the multiple access channel 65 has the identical code spreading sequence, which is also supplied to the matched filter or correlator 67. The matched filter or correlator output line 69 contains all of the chip samples from all of the multiple signals and delivers those to a timing processing device 71. The timing processing device also uses information stored in the interference storage device 87 which stores the two possible interference sequences. In an alternative embodiment the system timing control may operate at a lower degree of efficiency without the use of the interference information as stored in 87. The receiver information signal 69 is also supplied to a timing control circuit 75, which uses the addresses contained in the information signal 69 and the output of the processor timing algorithms to create specific timing advance or retard signals 77, which are broadcast 79 from the hub transmitter 81. The individual transmitters 83 recognize their addresses in the broadcast signal 79, and advance or retard their timing.

Figure 8:
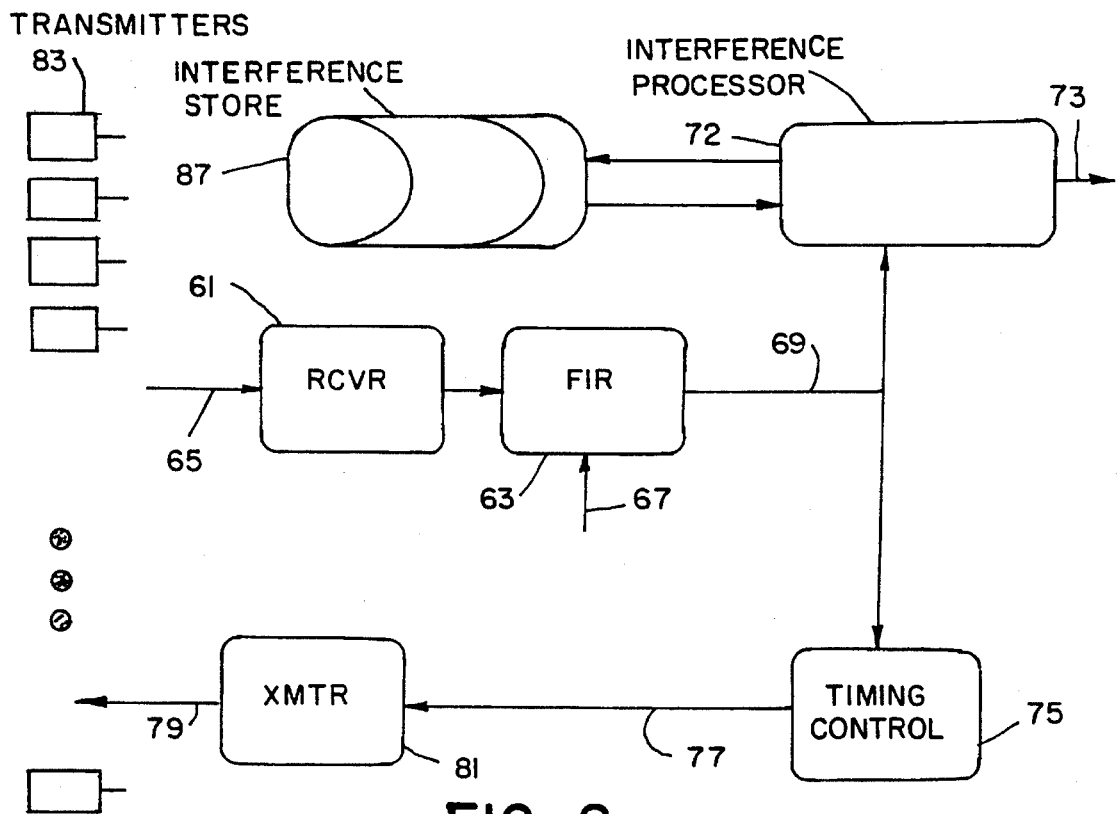
FIG. 8 is a schematic representation of Interference Processing with a single spreading sequence for all transmitters.

FIG. 8 schematically shows a receiver 61, which processes the received signal to obtain chip samples which are processed by a matched filter or correlator 63. The receiver 61 receives the multiple input signals 65 from a single packet radio channel, microwave channel, fiber optic channel, satellite channel, cable or wire. Each of the signals in the multiple access channel 65 has the identical code spreading sequence, which is also supplied to the matched filter or correlator 67. The matched filter or correlator output line 69 contains all of the chip samples from all of the multiple signals and delivers those to an interference processing device 72. The interference processing device also uses information stored in the interference storage device 87 which stores the two possible interference sequences. The interference processing device will process the individual chip samples 69 to form the individual bits 73 from each received packet. The bit decisions are combined with the chip interference patterns stored in the interference storage device 87 in order to remove interference patterns from succeeding sequences of chips and to increase the reliability of additional bit decisions by the interference processor.

Figure 9:
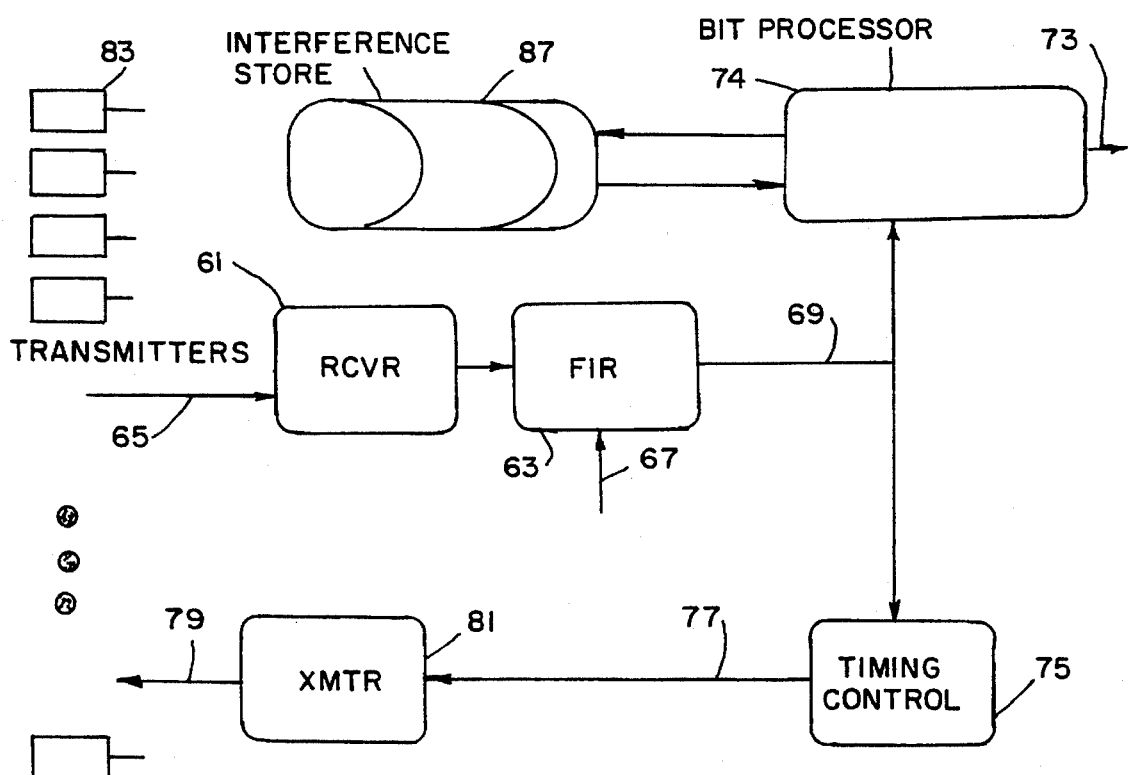
FIG. 9 is a schematic representation of Bit Processing with a single spreading sequence for all transmitters.

FIG. 9 schematically shows a receiver 61, which processes the received signal to obtain chip samples which are processed by a matched filter or correlator 63. The receiver 61 receives the multiple input signals 65 from a single packet radio channel, microwave channel, fiber optic channel, satellite channel, cable or wire. Each of the signals in the multiple access channel 65 has the identical code spreading sequence, which is also supplied to the matched filter or correlator 67. The matched filter or correlator output line 69 contains all of the chip samples from all of the multiple signals and delivers those to a bit processing device 74.

In an alternate embodiment the timing processing device 71 of FIG. 7, the interference processing device 72 of FIG. 8 and the bit processing device 74 of FIG. 9 may all be combined into a single processing device.

In an alternate embodiment the bit processing device 74 of FIG. 9 may operate without the use of the timing processing device 71 of FIG. 7.

In an alternate embodiment the bit processing device 74 of FIG. 9 may operate without the use of the interference processing device 72 and the interference store device 87 of FIG. 7.

I claim:

1. The method of providing multiple access to a data communications channel, comprising forming multiple data signals with an identical code spreading sequence in multiple transmitters, transmitting the multiple data signals from the multiple transmitters, detecting the multiple signals with a single matched filter or correlator or a multiplicity of matched filters or correlators matched to a single code spreading sequence in a hub station, using an output of the matched filter in the hub station for respectively offsetting the transmitted data signals by retarding and advancing some of the transmitted data signals, and transmitting control signals from the hub station to the transmitters for respectively advancing or retarding timing of some of the multiple transmitters for offsetting the transmitted data signals from the transmitters using an identical code spreading sequence for receiving at the hub station data signals offset from each other by an integer number of chip times.

2. The method of claim 1, wherein the transmitting comprises transmitting multiple signals on a channel medium such as but not limited to packet radio channels, microwave channels, fiber optic channels, satellite channels, cables and wires.

3. The method of simplifying a process of signal detection in a multiple access data communications channel, comprising broadcasting pilot signals from a hub station, controlling multiple data signals using the identical code spreading sequence from multiple transmitters with the pilot signals, transmitting the multiple data signals from the multiple transmitters, receiving the multiple data signals at the hub station, detecting the multiple data signals with a matched filter or correlator matched to a single code spreading sequence at the hub station, using an output of the matched filter or correlator matched to a single code spreading sequence in the hub station for creating control signals for offsetting the transmitted data signals by advancing or retarding timing of the transmitting the multiple data signals from the multiple transmitters, broadcasting the control signals to the multiple transmitters, and receiving the offset transmitted data signals using identical code spreading sequences from the transmitters at the hub station with the data signals offset from each other by a different number of chip times, thus ensuring that signals from different transmitters do not interfere with each other.

4. The method of claim 3, wherein the transmitting comprises transmitting multiple signals on a channel medium such as but not limited to packet radio channels, microwave channels, fiber optic channels, satellite channels, cables and wires.

5. The method of claim 3, further comprising selecting the single code spreading sequence for the transmitters from a specific class of codes known as maximum length shift register (MLSR) sequences or m-sequences in a length equal to $2^n-1$ for all integer values of n, and minimizing mutual signal interference for a random sequence of zeros and ones.

6. The method of claim 3, further comprising subtracting successive signals from the received signals for allowing easier detecting of other signals contained in the received signals, reconstructing one of only two possible interference patterns and subtracting these patterns at the output of a ,matched filter or correlator matched to a single code spreading sequence, and detecting the multiple signals in a single multiple access channel in the presence of mutual signal interference.

7. The method of claim 6, wherein the subtracting further comprises determining a strongest or an earliest signal to arrive at the hub station and then using a subtraction algorithm for subtracting the first signal from signals at the output of a matched filter or correlator matched to a single code spreading sequence, examining remaining signals after subtracting the first signal, detecting a next signal, and repeating the process as long as a new remaining signal is picked out of the multiple access channel.

8. The method of claim 6, wherein the subtracting further comprises storing two multilevel interference signals which are outputs of the matched filter when (1) the input is not composed of a bit transition in the received signals, and when (2) the input is composed of a bit transition in the received signal, using the two multilevel interference signals for reconstructing the output of the matched filter or correlator matched to a single code spreading sequence due to a packet which is detected, then subtracting the reconstructed signals due to the detected packet from signals at the matched filter or correlator matched to a single code spreading sequence, and detecting a next packet, repeating the process successively for weaker and weaker signals at the matched filter, or for packets which arrive before other packets, and eliminating interference of packets with each other.

9. The method of providing multiple access to a data communications channel, comprising using an identical code spreading sequence in creating multiple signals in multiple transmitters, transmitting the multiple signals from the multiple transmitters in a multiple access channel, receiving the multiple signals at a hub station, and detecting the multiple signals by using a single matched filter or correlator matched to a single code spreading sequence in the hub station, subtracting successive signals in the multiple access channel from the received signals for allowing easier detecting of other signals contained in the received signals, and detecting the multiple signals in the multiple access channel in the presence of mutual interference.

10. The method of claim 9, further comprising selecting the single code spreading sequence for the all transmitters from a specific class of codes known as maximum length shift register (MLSR) sequences or m-sequences in a length equal to $2^n-1$ for integer values of n, and producing reduced interference as compared with interference produced using a code selected at random.

11. The method of claim 9, wherein the subtracting further comprises determining a strongest or earliest signal to arrive at the hub station and then applying a subtraction algorithm and subtracting the first signal from the multiple signals at the output of the matched filter or correlator matched to a single code spreading sequence, examining remaining signals after subtracting the first signal, detecting a next signal, subtracting the next signal, and repeating the determining, subtracting and detecting as long as a new remaining signal is picked out of the multiple access channel, where each of the separate signals in the multiple access channel is spread by the identical code spreading sequence.

12. The method of claim 9, wherein the subtracting further comprises storing two multilevel interference signals which are outputs of the matched filter or correlator matched to a single code spreading sequence when (1) the input is not composed of a bit transition in the received signals, and when (2) the input is composed of a bit transition in the received signals, using the two multilevel interference signals for reconstructing an output of the matched filter or correlator matched to a single code spreading sequence due to a packet which is detected, then subtracting the reconstructed signals due to the detected packet from the received signals at the matched filter or correlator matched to a single code spreading sequence, and detecting the next packet, repeating the process successively for weaker and weaker signals into the matched filter or correlator matched to a single code spreading sequence, or for packets which arrive before other packets, and eliminating interference of packets with each other.

13. The method of claim 9, wherein the transmitting comprises transmitting multiple signals on a channel medium such as but not limited to packet radio channels, microwave channels, fiber optic channels, satellite channels, cables and wires.

14. The method of providing a multiple access data communications channel, comprising selecting a common identical code spreading sequence for all transmitters from a specific class of codes known as maximum length shift register (MLSR) sequences or m-sequences in a length equal to $2^n-1$ for integer values of n, using the identical code spreading sequence in multiple transmitters creating multiple data signals with the identical code spreading sequence in the multiple transmitters, transmitting the multiple data signals from the multiple transmitters, detecting the multiple data signals with a matched filter or correlator matched to a single code spreading sequence in a hub station, using signals at the matched filter or correlator matched to a single code spreading sequence in the hub station for separating the multiple data signals, and producing reduced mutual signal interference as compared with mutual signal interference produced by selecting a code in a random or pseudorandom manner.

15. The method of claim 14, wherein the transmitting comprises transmitting multiple signals on a channel medium such as but not limited to packet radio channels, microwave channels, fiber optic channels, satellite channels, cables and wires.

16. The method of claim 14, further comprising using output signals of the matched filter or correlator matched to a single code spreading sequence in the hub station for transmitting control signals to the multiple transmitters using identical code spreading sequences for advancing or retarding timing of some of the multiple transmitters using identical code spreading sequences for receiving the transmitted signals from the transmitters using identical code spreading sequences at the hub station offset from each other, ensuring that signals from different transmitters using identical code spreading sequences do not interfere with each other.

* * * * *